United States Patent
Bottomley et al.

(10) Patent No.: US 7,587,219 B2
(45) Date of Patent: Sep. 8, 2009

(54) SYSTEM AND METHOD FOR ADAPTIVE BROADCAST SERVICE

(75) Inventors: Gregory E. Bottomley, Cary, NC (US); Ali S. Khayrallah, Cary, NC (US); Erik Bengt Lennart Dahlman, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 733 days.

(21) Appl. No.: 11/167,370

(22) Filed: Jun. 27, 2005

(65) Prior Publication Data
US 2006/0293074 A1 Dec. 28, 2006

(51) Int. Cl.
H04B 7/00 (2006.01)
(52) U.S. Cl. .................. 455/522; 455/69; 455/13.4; 455/67.13; 455/422.1; 455/452.2; 455/453; 455/503; 455/504; 370/329; 370/342
(58) Field of Classification Search ........... 455/522, 455/69, 13.4, 452.2, 453, 503, 504, 505, 455/506, 422.1, 454, 67.13; 370/328, 329, 370/342
See application file for complete search history.

(56) References Cited

U.S. PATENT DOCUMENTS

| | | | |
|---|---|---|---|
| 5,881,368 A | | 3/1999 | Grob et al. |
| 2003/0119452 A1 | | 6/2003 | Kim et al. |
| 2003/0126619 A1 | | 7/2003 | Moon |
| 2004/0229572 A1 | | 11/2004 | Cai et al. |
| 2005/0075124 A1* | | 4/2005 | Willenegger et al. ......... 455/522 |
| 2006/0209703 A1* | | 9/2006 | Baker et al. ................. 370/252 |
| 2007/0037523 A1* | | 2/2007 | Bi et al. ...................... 455/69 |

FOREIGN PATENT DOCUMENTS

| | | |
|---|---|---|
| EP | 1 530 307 A1 | 5/2005 |
| GB | 2 358 328 A | 1/2000 |

OTHER PUBLICATIONS

Z. Cakareski, et al, "Multilevel Coding of Broadcast Video Over Wireless Channels," Acoustics, Speech, and Signal Processing, 2002, Proceedings (ICASSP '02), IEEE International Conference on, vol. 3, pp. III-2797-III-2800, 2002.
Swedish Patent Office International Search Report for PCT/SE2006/050155 completed Dec. 22, 2006.

* cited by examiner

Primary Examiner—Matthew D Anderson
Assistant Examiner—Shaima Q Aminzay

(57) ABSTRACT

A system and method for adapting a broadcast service in a cellular communication network. A base station receives indications of channel quality from registered users of the broadcast service, and adapts broadcast transmission parameters to improve channel quality for the broadcast users if at least one of the broadcast users indicates that channel quality needs to be improved. If none of the broadcast users indicates that channel quality needs to be improved, the base station adapts the transmission parameters to decrease channel quality for the broadcast users. The transmission parameters may be adapted by techniques such as changing the broadcast transmit power, changing the level of FEC encoding and modulation, changing the number of channel resources allocated, or changing the transmission data rate for the broadcast service. When multiple base stations transmit the broadcast information, a base station controller may minimize network resource utilization by coordinating adaptation control among the base stations.

17 Claims, 8 Drawing Sheets

SYSTEM AND METHOD FOR ADAPTIVE BROADCAST SERVICE

BACKGROUND

The present invention relates to radio communication systems. More particularly, and not by way of limitation, the present invention is directed to a system and method for adapting a broadcast service for different users under varying conditions.

A broadcast service transmits the same information to multiple users operating over a geographic area. In a cellular radio communication network, one or more base stations transmit the information to mobile users operating within the associated cell(s). In conventional broadcast services, the information is sent blindly, and it is hoped that the information is received. There is no feedback from the users, and there are no control mechanisms within the network to ensure that the broadcast information is received. To ensure that the broadcast information is received by as many users as possible, the information is broadcast with high transmit power, and repeaters may be utilized to simulcast information.

A disadvantage of the conventional approach is that a large amount of network resources are utilized by the broadcast service. In systems such as Direct Sequence Code Division Multiple Access (DS-CDMA) systems, the broadcast service may utilize a large amount of the avaible transmit power and channel codes, and may cause interference to other services. In Orthogonal Frequency Division Multiplexed (OFDM) systems, the broadcast service may utilize a large amount of the avaible transmit power and tone frequencies. What is needed in the art is a system and method for adapting a broadcast service for different users under varying conditions, that overcomes the deficiencies of conventional systems and methods.

SUMMARY

In one aspect, the present invention is directed to a method of adapting a broadcast service in a cellular radio communication system. The method includes receiving in a base station, indications of channel quality from registered users of the broadcast service; adapting broadcast transmission parameters by the base station to improve channel quality for the registered broadcast users if at least one of the broadcast users indicates that channel quality needs to be improved; and adapting broadcast transmission parameters by the base station to decrease channel quality for the registered broadcast users if none of the broadcast users indicates that channel quality needs to be improved. The broadcast transmission parameters may be adapted by utilizing one or more techniques such as increasing or decreasing broadcast transmit power for the broadcast service, allocating or de-allocating channel resources for the broadcast service, increasing or decreasing a level of forward error correction (FEC) encoding for the broadcast service, and increasing or decreasing a transmission data rate for the broadcast service.

In another aspect, the present invention is directed to a method of adapting a broadcast service in which broadcast information is divided into basic broadcast information and advanced broadcast information. A base station adapts broadcast transmission parameters to ensure that all broadcast users receive the basic broadcast information. If some of the broadcast users have channel quality below a threshold level, the base station adapts broadcast transmission parameters to ensure that only broadcast users with channel quality at or above the threshold level receive the advanced broadcast information. If none of the broadcast users have channel quality below the threshold level, the base station adapts broadcast transmission parameters to ensure that all broadcast users receive the advanced broadcast information as well.

In yet another aspect, the present invention is directed to a system in a base station for adapting a broadcast service in a cellular radio communication network. The system includes means for receiving and analyzing indications of channel quality from registered users of the broadcast service; means for adapting broadcast transmission parameters to improve channel quality for the registered broadcast users if at least one of the broadcast users indicates that channel quality needs to be improved; and means for adapting broadcast transmission parameters to decrease channel quality for the registered broadcast users if none of the broadcast users indicates that channel quality needs to be improved. The system may adapt the broadcast transmission parameters by utilizing one or more techniques such as increasing or decreasing broadcast transmit power for the broadcast service, allocating or de-allocating channel resources for the broadcast service, increasing or decreasing a level of FEC encoding for the broadcast service, and increasing or decreasing a transmission data rate for the broadcast service.

In still yet another aspect, the present invention is directed to a system in a cellular radio communication network for adapting a broadcast service. The system includes a plurality of base stations serving registered users of the broadcast service, and a controlling network node for controlling the plurality of base stations to minimize network resources utilized for the broadcast service. Each of the base stations includes means for receiving and analyzing indications of channel quality from broadcast users; means for adapting broadcast transmission parameters to improve channel quality for the registered broadcast users if at least one of the broadcast users indicates that channel quality needs to be improved; and means for adapting broadcast transmission parameters to decrease channel quality for the registered broadcast users if none of the broadcast users indicates that channel quality needs to be improved. The controlling network node coordinates the adaptation of broadcast transmission parameters among the plurality of base stations to minimize network resources utilized for the broadcast service.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

The present invention recognizes that in networks such as Wideband Code Division Multiple Access (WCDMA) and Direct Sequence CDMA (DS-CDMA) systems, users register with the system each time they wish to receive a broadcast service. As a result, the system knows which users are supposed to get the broadcast information and which users are not. In addition, the users provide feedback to the network regarding the quality of the received signal. The present invention utilizes this information to adapt the broadcast service to changing users and changing radio conditions. As a result, the use of system resources to support the broadcast service is minimized.

In general, the adaptive broadcast service utilizes one or more techniques to adapt the broadcast to one or more of the broadcast users. The techniques may include power control, encoding and modulation, rate control, and beamforming. Adaptation is based on information concerning those users who are registered to use the broadcast service. This information may be determined by the base station (for example, which beam a particular user is in) or may be provided by the user in a feedback message (for example, a power control command, a report of signal-to-noise ratio (SNR), or a channel response message). The service may adapt to the worst-case broadcast user, may provide differentiated services to different groups of broadcast users, or may adapt to a mix of broadcast and non-broadcast users.

In one embodiment of the present invention, the base station or base station controller expands system resources only enough to handle the worst-case broadcast user. Thus, every registered broadcast user is served, but once the base station allocates the resources necessary to respond to feedback messages from the worst-case user, no additional resources are allocated to the broadcast service. No excess quality is provided to the broadcast service because the remaining system resources are allocated to other services.

Several different techniques may be utilized to adaptively allocate and de-allocate resources. One such technique is referred to herein as "group power control". With group power control, each registered broadcast user sends an indication to the base station asking for more or less power. If all of the broadcast users indicate they need less power, the base station lowers the transmit power allocated to the broadcast service. However, if at least one broadcast user says it needs more power, the base station increases the power until that user is satisfied. If there are no registered broadcast users in the cell, the base station may set the broadcast power to zero.

Figure 1:
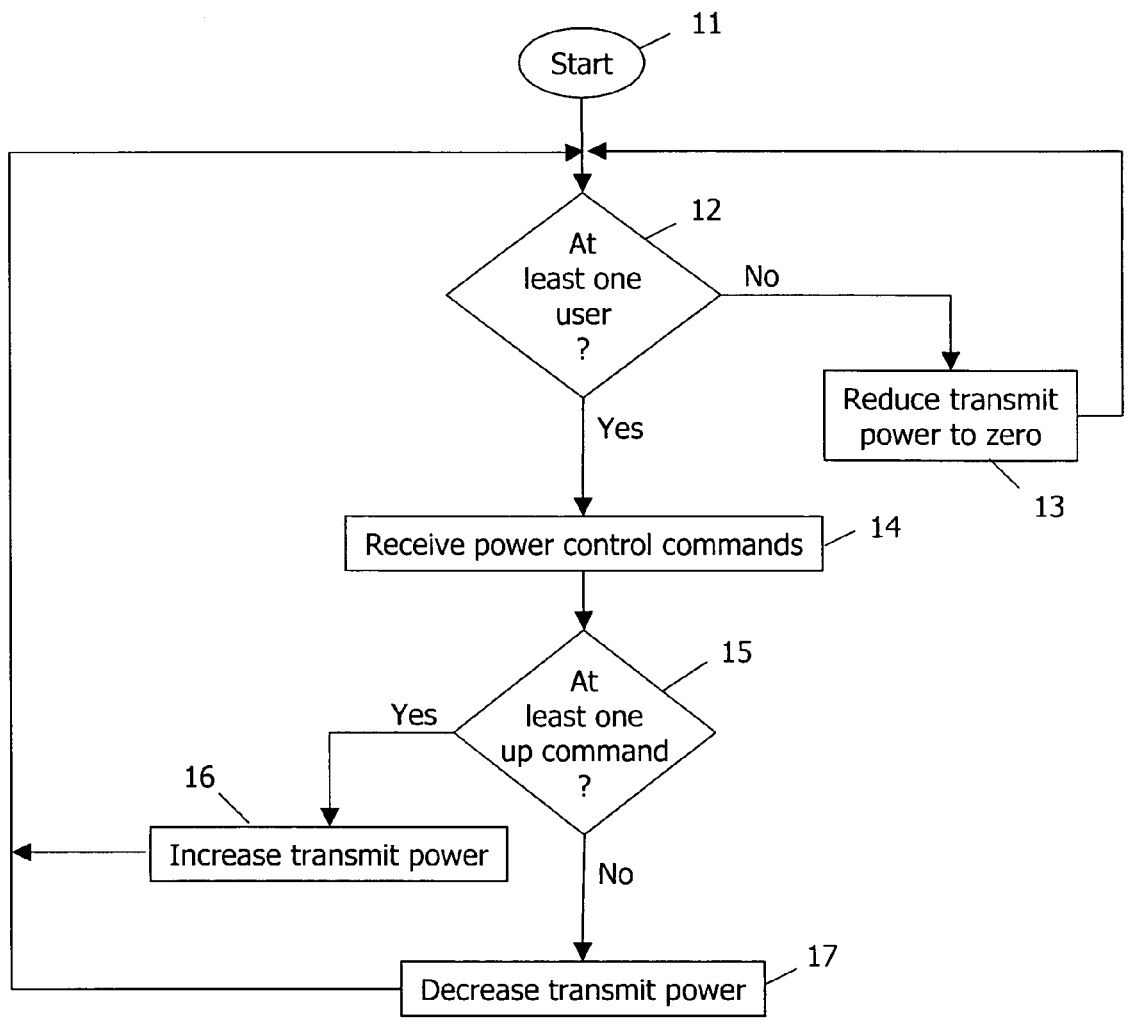
FIG. 1 is a flow chart illustrating the steps of the method of the present invention when performing group power control in a base station.

FIG. 1 is a flow chart illustrating the steps of the method of the present invention when performing group power control in a base station. The process starts at step 11 and at step 12 determines whether there is at least one registered broadcast user in the associated cell for a particular broadcast service. If not, the process moves to step 13 where the base station reduces the transmit power to zero. If there is at least one registered broadcast user in the cell, the process moves to step 14 where the base station receives power control commands from the broadcast users. As noted above, these commands may be actual power control commands or other messages from which the base station can determine that the transmit power needs to be increased or decreased. At step 15, it is determined whether at least one "up command" (i.e., a message indicating the transmit power needs to be increased) is received from the broadcast users. If at least one up command is received, the process moves to step 16 where the base station increases the transmit power. The process then returns to step 12. If no up commands are received, the process moves to step 17 where the base station decreases the transmit power. The process then returns to step 12.

Another technique for adaptively allocating and de-allocating resources is referred to herein as "group encoding and modulation control". Broadcast information can be sent in different ways (for example with heavy coding or light coding), depending on the channel conditions of the broadcast users. For example, if all of the broadcast users have good channel conditions, less Forward Error Correction (FEC) encoding is needed, so that fewer modern bits need to be transmitted. If at least one broadcast user has bad channel conditions, more FEC encoding can be applied. The amount of encoding can be determined from a list of finite possibilities. The base station may transmit which encoding option is being utilized for a given time period. Once again, the worst-case broadcast user is satisfied, and the remaining coding resources remain available for other services.

Figure 2:
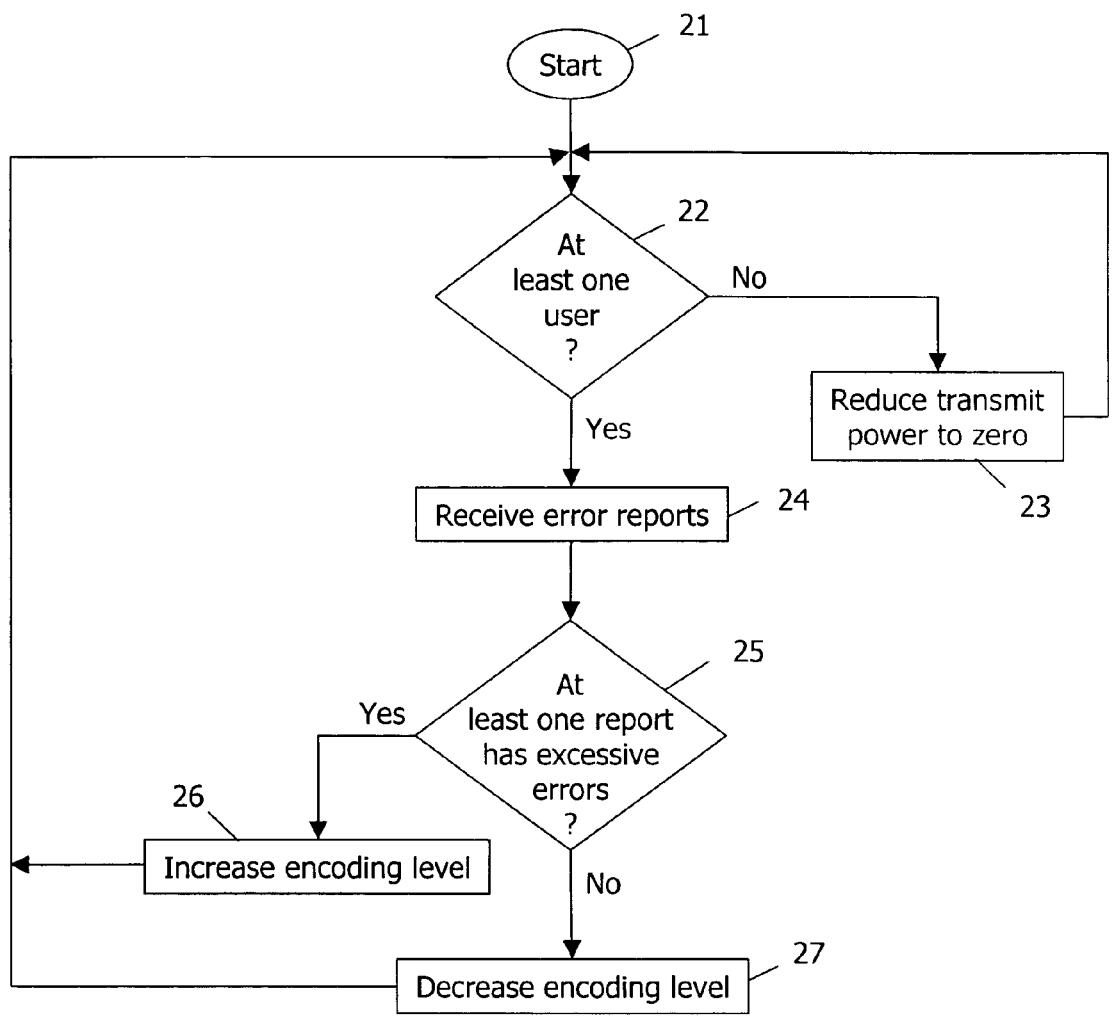
FIG. 2 is a flow chart illustrating the steps of the method of the present invention when performing group encoding and modulation control in a base station.

FIG. 2 is a flow chart illustrating the steps of the method of the present invention when performing group encoding and modulation control in a base station. The process starts at step 21 and at step 22 determines whether there is at least one registered broadcast user in the associated cell. If not, the process moves to step 23 where the base station reduces the transmit power to zero. If there is at least one registered broadcast user in the cell, the process moves to step 24 where the base station receives error reports from the broadcast users. At step 25, it is determined whether at least one of the error reports indicates the broadcast information was received with excessive errors. If at least one excessive error report is received, the process moves to step 26 where the base station increases the encoding level. The process then returns to step 22. If no excessive error reports are received, the process moves to step 27 where the base station decreases the encoding level. The process then returns to step 22.

In addition, channel resources (for example, spreading codes, carrier frequencies, time slots, and the like) may be allocated or de-allocated to a particular broadcast service depending on feedback from users in the form of service requests and service terminations. For example, if no users are watching a particular news video service, there is no need to allocate channel resources to that service. De-allocated resources can be reassigned to other services, including other broadcast services.

Another technique for adaptively allocating and de-allocating resources is referred to herein as "group rate control". In this technique, the amount of broadcast information is adapted based on the worst-case user. The broadcast data rate is reduced for all users when the worst-case user has bad channel conditions. For audio, different audio rates may be generated using, for example, the adaptive multi-rate (AMR) encoder utilized in GSM systems. For images and video, different rates may be utilized to provide different quality levels.

Figure 3:
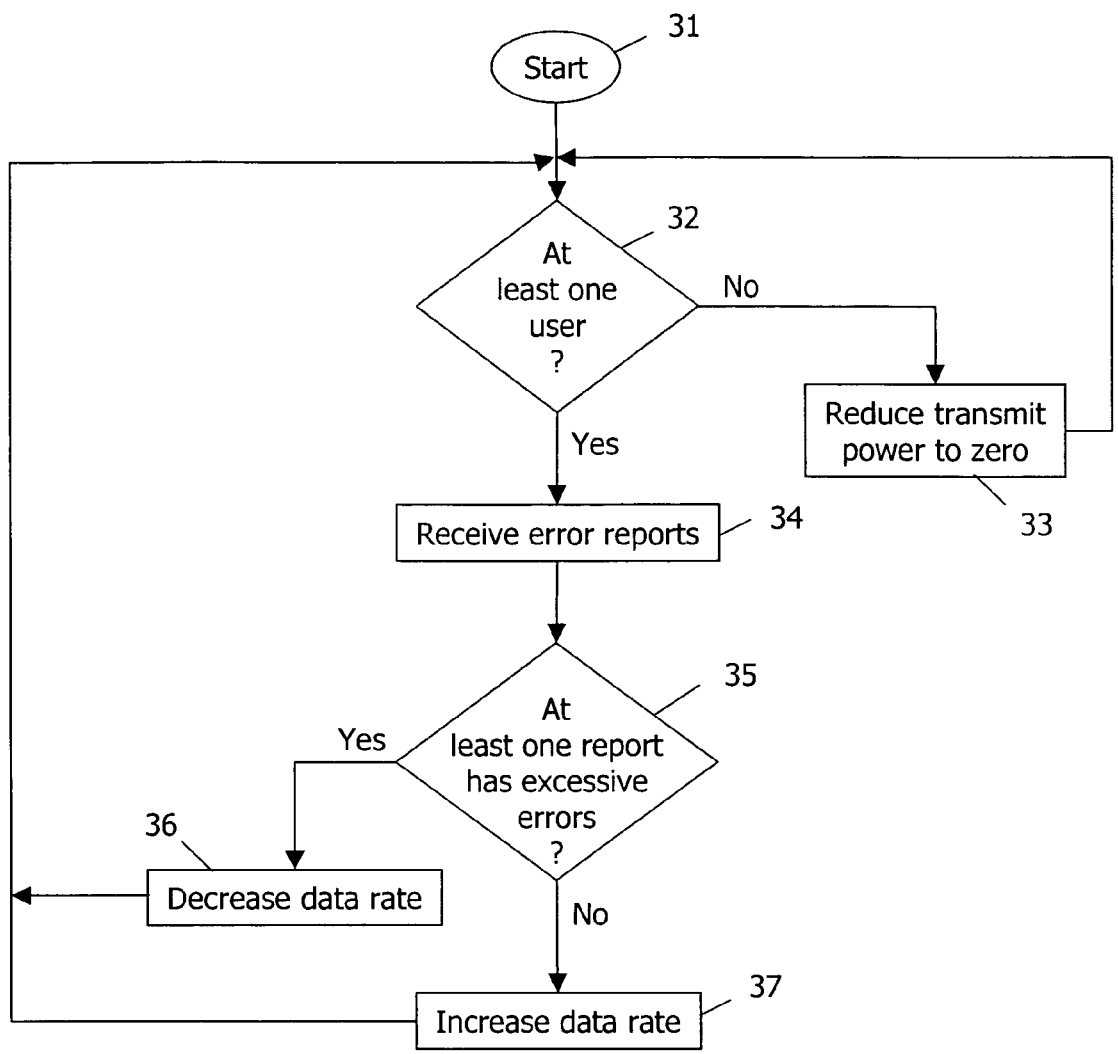
FIG. 3 is a flow chart illustrating the steps of the method of the present invention when performing group rate control in a base station.

FIG. 3 is a flow chart illustrating the steps of the method of the present invention when performing group rate control in a base station. The process starts at step 31 and at step 32 determines whether there is at least one registered broadcast user in the associated cell. If not, the process moves to step 33 where the base station reduces the transmit power to zero. If there is at least one registered broadcast user in the cell, the process moves to step 34 where the base station receives error reports from the broadcast users. At step 35, it is determined whether at least one of the error reports indicates the broadcast information was received with excessive errors. If at least one excessive error report is received, the process moves to step 36 where the base station decreases the transmitted data rate for the broadcast signal. The process then returns to step 32. If no excessive error reports are received, the process moves to step 37 where the base station increases the transmitted data rate. The process then returns to step 32.

It should be noted that the techniques for adaptive resource allocation may be used alone or in combination. For example, group power control may be utilized until a predefined upper limit of the transmit power is reached. At that point, if the worst-case user still has a bad signal, additional encoding may be applied or the transmitted data rate may be reduced.

Figure 4:
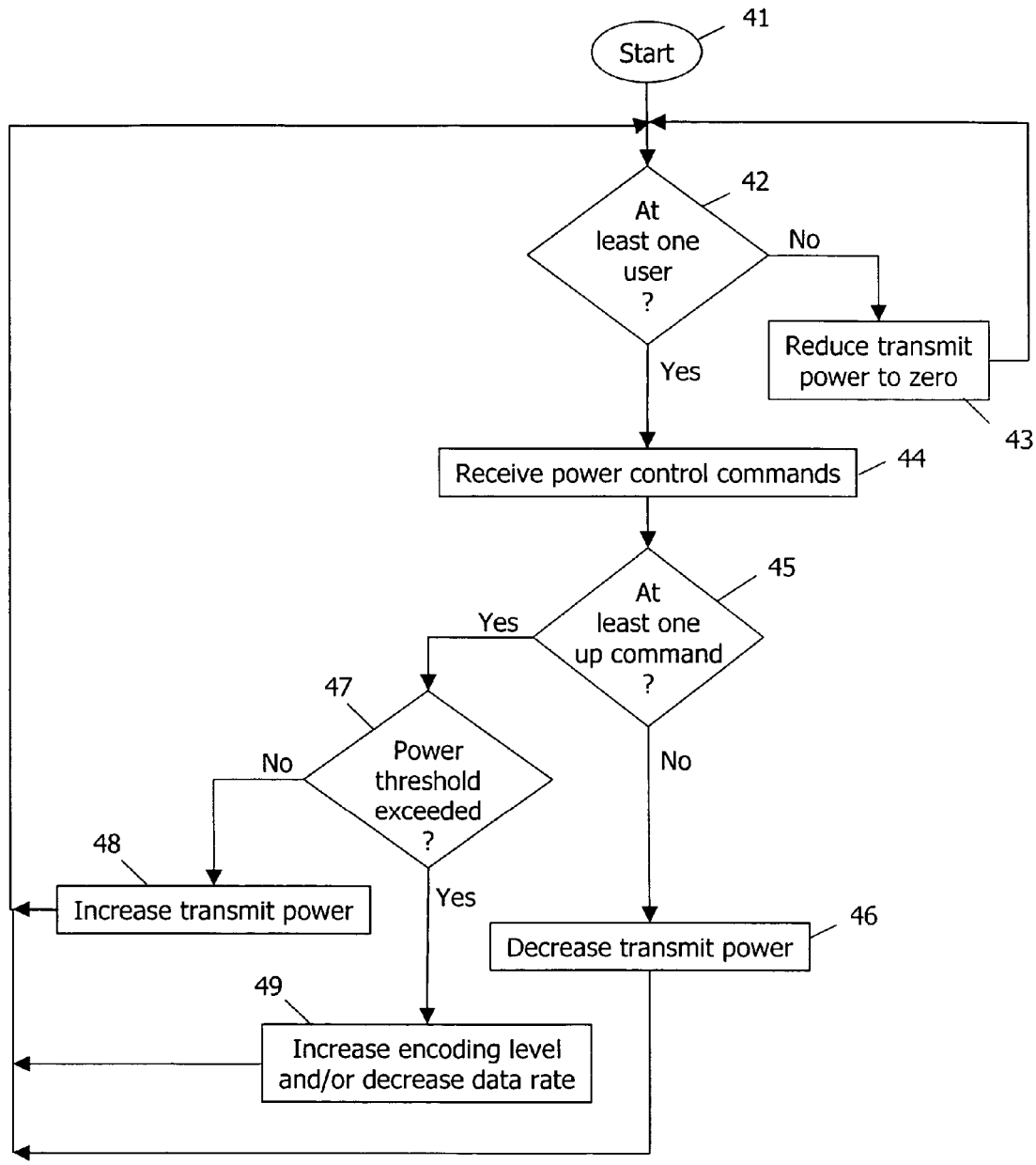
FIG. 4 is a flow chart illustrating the steps of the method of the present invention when several group control techniques are used in combination in a base station.

FIG. 4 is a flow chart illustrating the steps of the method of the present invention when several group control techniques are used in combination in a base station. The process starts at step 41 and at step 42 determines whether there is at least one registered broadcast user in the associated cell. If not, the process moves to step 43 where the base station reduces the transmit power to zero. If there is at least one registered broadcast user in the cell, the process moves to step 44 where the base station receives power control commands from the broadcast users. At step 45, it is determined whether at least one "up command" (i.e., a message indicating the transmit power needs to be increased) is received from the broadcast users. If no up commands are received, the process moves to step 46 where the base station decreases the transmit power. The process then returns to step 42.

If at least one up command is received, the process moves to step 47 where it is determined whether the upper threshold of the transmit power would be exceeded if the transmit power is increased. If not, the process moves to step 48 where the base station increases the transmit power. The process then returns to step 42. However, if the upper threshold of the transmit power would be exceeded if the transmit power is increased, the process moves to step 49 where the base station may apply additional encoding or may reduce the transmitted data rate. The process then returns to step 42.

In another embodiment of the present invention, rather than adapting the particular broadcast service to satisfy the worst-case broadcast user, the base station or base station controller adapts the service to provide a different quality of service to different groups of broadcast users. In one form of this embodiment, the base station attempts to satisfy the worst-case user within predefined adaptation limits. For example, an upper limit may be established for the transmit power allocated to the broadcast service. If the worst-case user's channel conditions require more power than that, the service does not adapt, and the worst-case user suffers. Thus, any broadcast users that cannot be satisfied within the predefined adaptation limits receive a quality of service that is lower than the remaining broadcast users. The base station may set the upper limit of the transmit power based on traffic conditions such as the perceived level of traffic on the downlink. If the base station detects a lot of downlink traffic, the base station does not allocate as much transmit power to the broadcast service because the power is needed for the other traffic.

Figure 5:
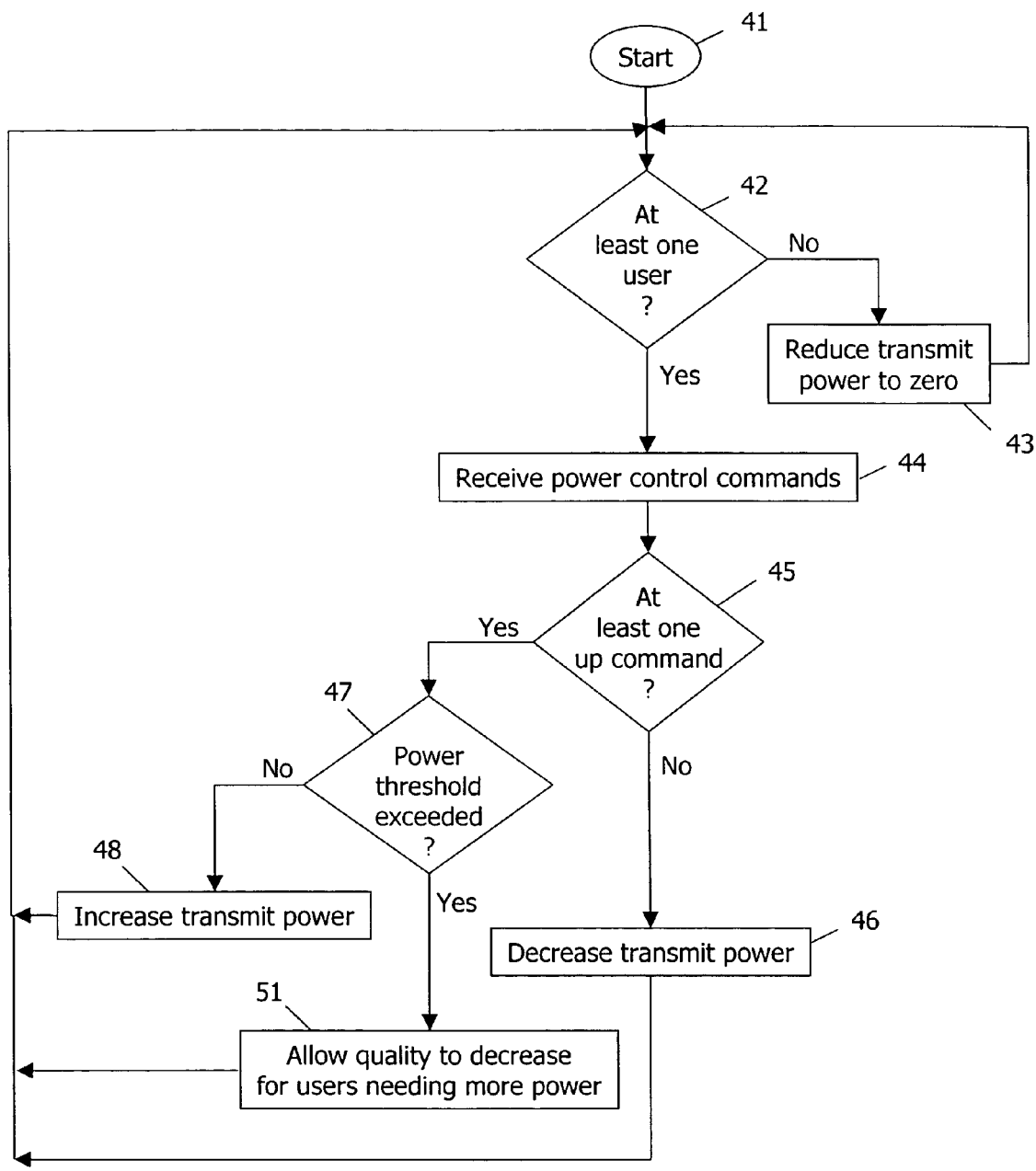
FIG. 5 is a flow chart illustrating the steps of the method of the present invention when an adaptation limit is utilized.

FIG. 5 is a flow chart illustrating the steps of the method of the present invention when an adaptation limit is utilized. This embodiment follows the same flow as illustrated in FIG. 4 until it is determined at step 47 that the upper threshold limit for the transmit power would be exceeded if the transmit power is increased. In this embodiment, any broadcast users that cannot be satisfied within the predefined adaptation limits receive a quality of service that is lower than the remaining broadcast users. Therefore, the process moves to step 51 where the quality is allowed to decrease for those broadcast users needing more power.

In another form of this embodiment, the broadcast information is divided into different classes. For example, one class may contain basic/minimal broadcast information while another class contains both the basic information and advanced information. The broadcast service ensures that all or some number of the broadcast users receive the basic/minimal content using, for example, the group control techniques described above. However, only the users with good channel conditions are likely to receive the advanced information. The advanced information may be transmitted at a nominal power with fixed encoding and modulation. If no broadcast users in a particular cell or beam have good channel conditions, the service may not broadcast the advanced information in that cell or beam. Additionally, transmit power may be set to zero if no broadcast users are present in a particular cell or beam. In DS-CDMA systems, the basic information may be transmitted on one spreading code while the advanced information is transmitted on another spreading code.

Figure 6:
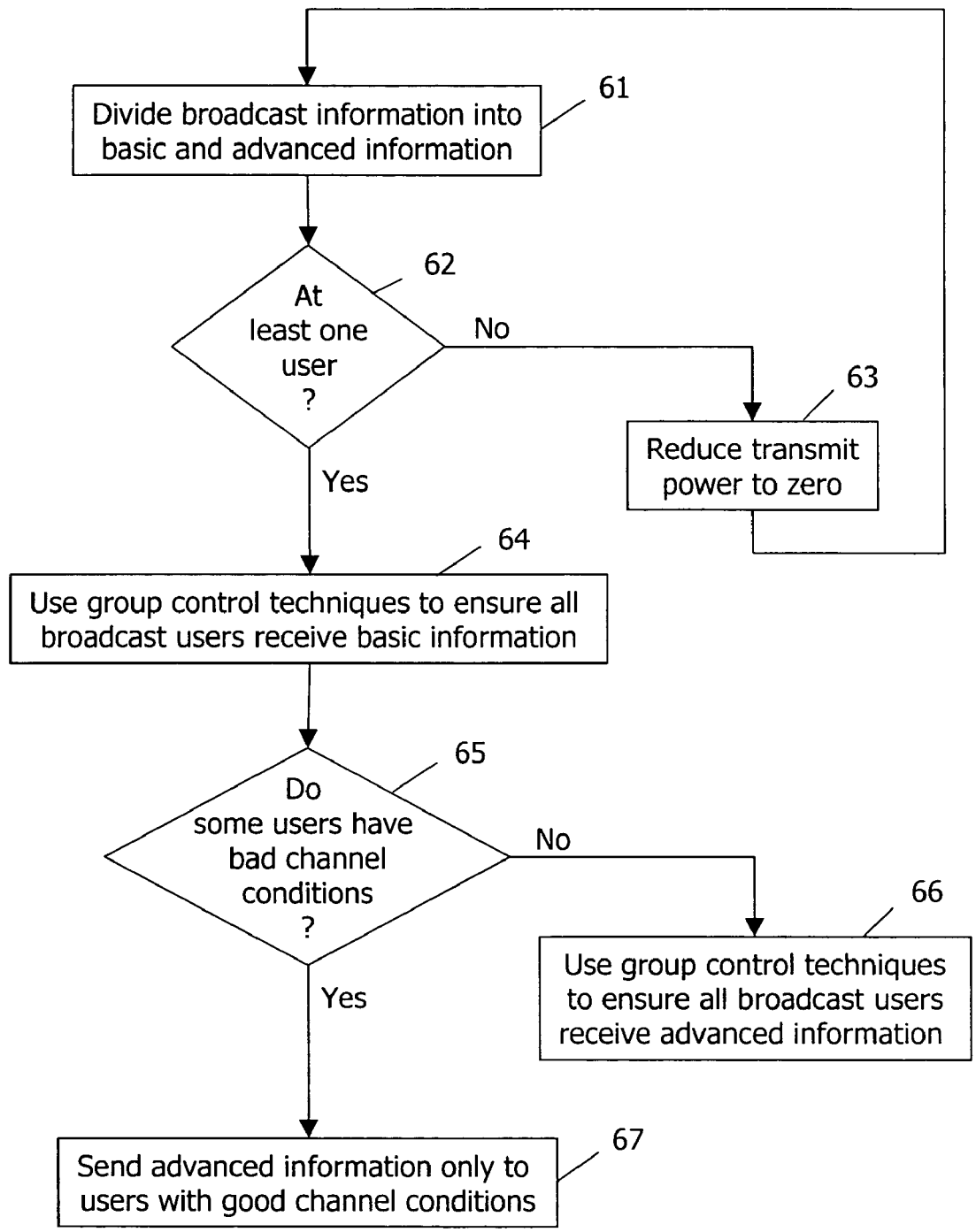
FIG. 6 is a flow chart illustrating the steps of the method of the present invention when the broadcast information is divided into different classes.

FIG. 6 is a flow chart illustrating the steps of the method of the present invention when the broadcast information is divided into different classes. At step 61, the broadcast information is divided into basic/minimal information and advanced information. At step 62, it is determined whether there is at least one registered broadcast user in the associated cell. If not, the process moves to step 63 where the base station reduces the transmit power to zero. If there is at least one registered broadcast user in the cell, the process moves to step 64 where the base station uses the group control techniques described above to ensure that all broadcast users receive the basic/minimal information. At step 65, it is determined whether some of the broadcast users have bad channel conditions. If not, the process moves to step 66 where the base station uses the group control techniques to ensure that all broadcast users receive the advanced information as well. However, if some of the broadcast users have bad channel conditions, the process moves to step 67 where the base station sends the advanced information to ensure that those broadcast users with good channel conditions receive it.

In some cases, the advanced information may be adapted as well as the basic/minimal information. For example, the advanced information may be power-controlled separately. If at least K advanced users ask for additional power, the transmit power is increased. The variable K may be a fixed fraction of the total broadcast users, or may be a fixed number of users. For example, the broadcast service may ensure that the top 50 percent of the users receive the advanced information. The variable K may also be based on service guarantees, ensuring that certain preferred users receive the advanced information.

With OFDM, adaptation may be used to determine which tones or channels to use to send the basic and advanced information. Based on feedback from all broadcast users, the base station determines tones that are sufficient for all broadcast users, and sends the basic/minimal information on those tones. The base station sends the advanced information on the remaining tones.

In another embodiment of the present invention, the base station or base station controller adapts the broadcast service to protect non-broadcast users. For example, with more sophisticated group beamforming, a null may be steered in the direction of a non-broadcast user whenever the base station transmits broadcast information. This procedure may be particularly useful when there is a small number of non-broadcast users.

The invention may also determine which non-broadcast users are in more need of nulling (or require deeper nulls) than others. For example, if a particular non-broadcast user is about to be sent a large amount of data, which requires a lot of resources, it is important for the broadcast beam to steer a null toward that non-broadcast user to avoid additional interference, which may cause the user to request even more received power. The base station may also steer a null toward high data rate non-broadcast users. For example, when using HSDPA, high data rate bursts are sent to data users one at a time. At a particular time, if the high data rate user is a non-broadcast user, the base station may steer a null toward that user. Once again, this avoids additional interference, which may cause the high data rate non-broadcast user to request more received power.

Figure 7:
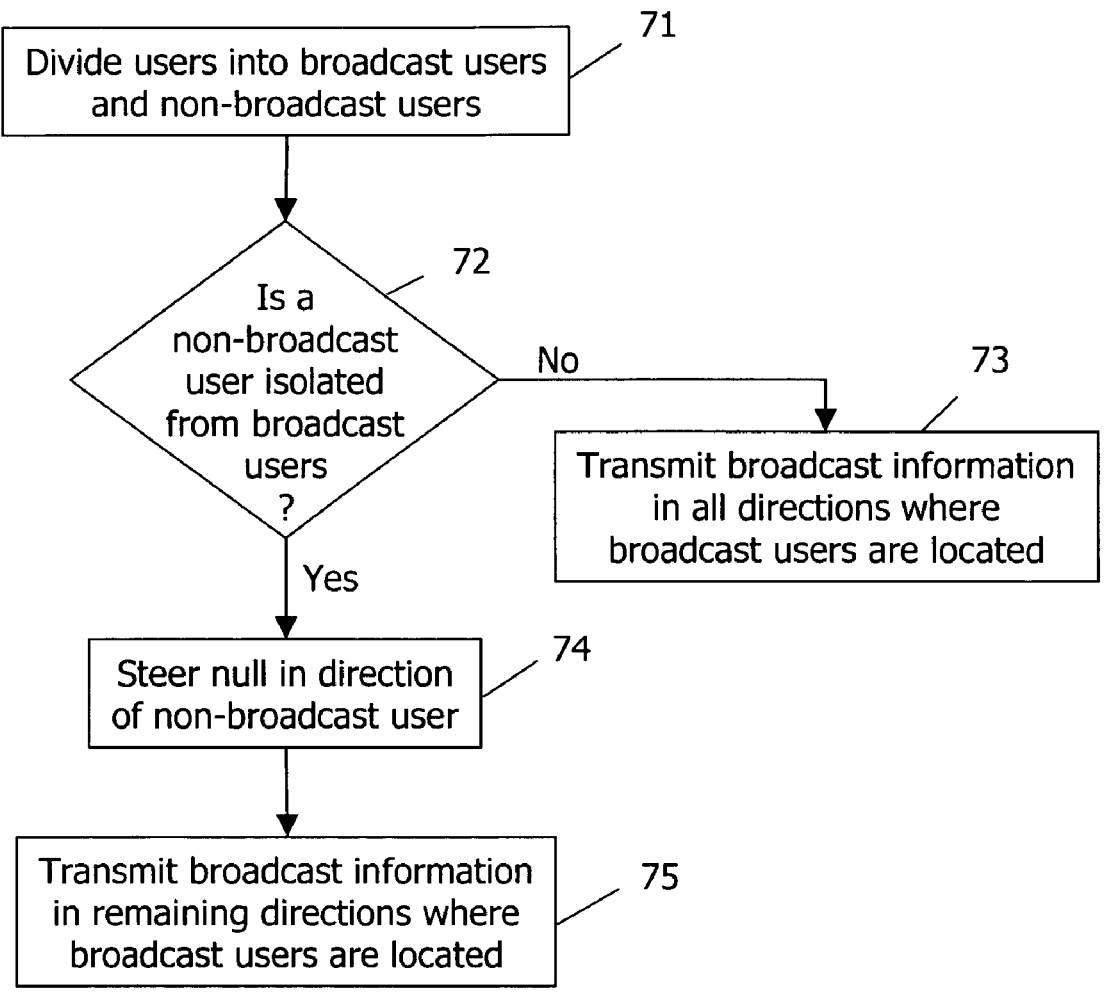
FIG. 7 is a flow chart illustrating the steps of the method of the present invention when non-broadcast users are protected from interference caused by the transmission of broadcast information.

FIG. 7 is a flow chart illustrating the steps of the method of the present invention when non-broadcast users are protected from interference caused by the transmission of broadcast information. At step 71, mobile users are divided into broadcast users and non-broadcast users. At step 72, it is determined whether a non-broadcast user is directionally isolated from broadcast users. As noted above, this non-broadcast user may have a particular need to avoid additional interference. If the non-broadcast user is not directionally isolated from broadcast users, the process moves to step 73 where the broadcast information is transmitted normally, i.e., in all directions where broadcast users are located. However, if the non-broadcast user is directionally isolated from broadcast users, the process moves to step 74 where the base station uses beam steering techniques to steer a null in the direction of the non-broadcast user. At step 75, the base station then transmits the broadcast information in the remaining directions where broadcast users are located.

In another embodiment of the present invention, the broadcast information is broadcast from multiple base stations, so there is a need for higher level control in the network. For example, a Base Station Controller (BSC) that controls several base stations may control the adaptation of the broadcast service in all of the base stations. The BSC considers feedback from broadcast users received at multiple base stations to coordinate the adaptation of transmission parameters among the several base stations, thereby minimizing the use of network resources for the broadcast service. This may add some extra signaling in the network, but is still advantageous. For example, a serving base station may think that a broadcast user needs more power or other resources, but a neighboring base station may have a clearer signal. Therefore, the user may not need additional power because the user can obtain the broadcast information from the neighboring base station. This can be determined at the BSC level, but not at the level of a single base station.

Figure 8:
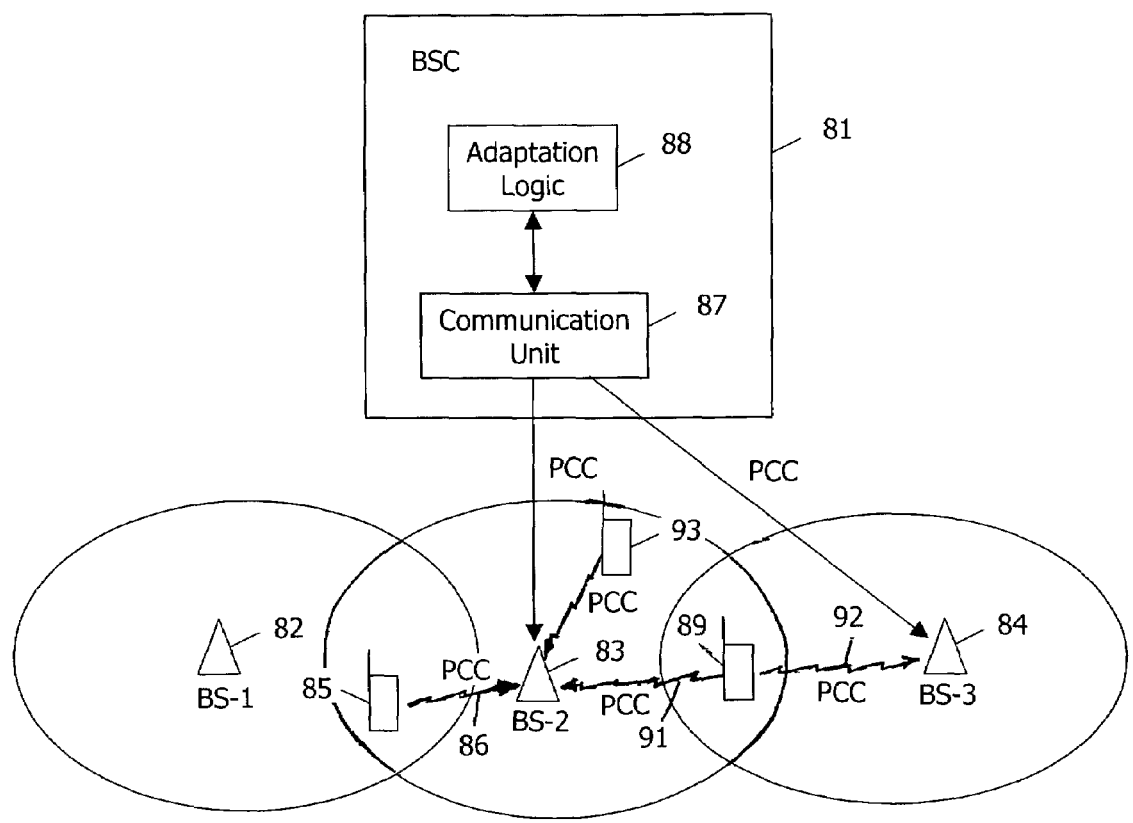
FIG. 8 is a simplified block diagram of the system of the present invention when the adaptation control is handled by a Base Station Controller (BSC).

FIG. 8 is a simplified block diagram of the system of the present invention when the adaptation control is handled by a BSC 81. In this example, the BSC controls BS-1 82, BS-2 83, and BS-3 84. A mobile user 85 is located between BS-1 and BS-2, and sends a power control command (PCC) 86 to BS-2 requesting more power. BS-2 forwards the PCC to the BSC. In the BSC, the PCC is received by a communication unit 87, which sends the PCC to adaptation logic 88. The adaptation logic recognizes that the mobile user 85 has a good signal from BS-1, and therefore orders BS-2 to keep its power at the current level rather than increasing it to satisfy the mobile user 85.

In another example, BS-2 83 and BS-3 84 may share a broadcast user 89 that sends PCC 91 to BS-2 and PCC 92 to BS-3 indicating to both BSs that it needs more power. If the control is at the base station level, both base stations will increase power. However, with control at the BSC level, the BSC 81 may determine that one base station has several users that need more power while the other base station only has the shared user. In this case, the BSC recognizes that BS-2 has several broadcast users 85, 89, and 93 that need more power, while BS-3 only has broadcast user 89 needing more power. Therefore, the BSC orders BS-2 with several needy users to increase power, while ordering BS-3 with only the shared user not to raise power. Thus, use of system resources is minimized, increasing overall system capacity.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of adapting a broadcast service in a cellular radio communication network, said method comprising:
   receiving in a base station, indications of channel quality from users who are registered with the network and are receiving the broadcast service;
   adapting broadcast transmission parameters by the base station to improve channel quality for the users when at least one of the received indications of channel quality indicates that channel quality needs to be improved;
   adapting broadcast transmission parameters by the base station to decrease channel quality for the users when none of the received indications of channel quality indicates that channel quality needs to be improved;
   determining whether there is a non-broadcast user being served by the base station; and
   steering a null in the base station's antenna beam pattern in the direction of the non-broadcast user during broadcast transmissions.

2. The method of claim 1, wherein the step of receiving indications of channel quality includes receiving in the base station, power control commands from the users, wherein each power control command indicates that an associated user requires the base station to increase or decrease transmit power for the broadcast service.

3. The method of claim 2, wherein the step of adapting broadcast transmission parameters to improve channel quality includes increasing broadcast transmit power by the base station, and the step of adapting broadcast transmission parameters to decrease channel quality includes decreasing broadcast transmit power by the base station.

4. The method of claim 2, wherein the step of increasing broadcast transmit power by the base station includes the steps of:
   determining whether increasing the transmit power would exceed an upper threshold limit for broadcast transmit power;
   when increasing the transmit power would not exceed the upper threshold limit, increasing broadcast transmit power; and
   when increasing the transmit power would exceed the upper threshold limit, leaving the broadcast transmit power at a current level and increasing by the base station, a level of forward error correction (FEC) encoding for the broadcast service.

5. The method of claim 2, wherein the step of increasing broadcast transmit power by the base station includes the steps of:
   determining whether increasing the transmit power would exceed an upper threshold limit for broadcast transmit power;
   when increasing the transmit power would not exceed the upper threshold limit, increasing broadcast transmit power; and when increasing the transmit power would exceed the upper threshold limit, leaving the broadcast transmit power at a current level and decreasing by the base station, a transmitted data rate for the broadcast service.

6. The method of claim 2, wherein the step of increasing broadcast transmit power by the base station includes the steps of:
   determining whether increasing the transmit power would exceed an upper threshold limit for broadcast transmit power;
   when increasing the transmit power would not exceed the upper threshold limit, increasing broadcast transmit power; and
   when increasing the transmit power would exceed the upper threshold limit, leaving the broadcast transmit power at a current level and allowing broadcast channel quality to degrade for any users needing more broadcast transmit power.

7. The method of claim 1, wherein the step of receiving indications of channel quality includes receiving in the base station, error reports from the users.

8. The method of claim 7, wherein the step of adapting broadcast transmission parameters to improve channel quality includes increasing by the base station, a level of forward error correction (FEC) encoding for the broadcast service, and the step of adapting broadcast transmission parameters to decrease channel quality includes decreasing by the base station, the level of FEC encoding for the broadcast service.

9. The method of claim 7, wherein the step of adapting broadcast transmission parameters to improve channel quality includes decreasing by the base station, a transmitted data rate for the broadcast service, and the step of adapting broadcast transmission parameters to decrease channel quality includes increasing by the base station, the transmitted data rate for the broadcast service.

10. The method of claim 1, further comprising, before the step of receiving indications of channel quality, the steps of:
    determining whether at least one user of a particular broadcast service is operating within a given service area of the base station; and
    when no users of the particular broadcast service are operating within the given service area of the base station, decreasing transmit power by the base station to zero for the given service area.

11. The method of claim 1, further comprising, before the step of receiving indications of channel quality, the steps of:
    determining whether at least one user of a particular broadcast service is operating within a given service area of the base station; and
    when no users of the particular broadcast service are operating within the given service area of the base station, de-allocating channel resources for the given service area.

12. The method of claim 1, further comprising, before the steering step, the step of determining whether the non-broadcast user has a service requirement that requires a low interference level, wherein the steering step is performed only when the non-broadcast user has a service requirement that requires a low interference level.

13. A system in a base station for adapting a broadcast service in a cellular radio communication network, said system comprising:
    means for receiving and analyzing indications of channel quality from users who are registered with the network and are receiving the broadcast service;
    means for adapting broadcast transmission parameters to improve channel quality for the users when at least one of the received indications of channel quality indicates that channel quality needs to be improved;
    means for adapting broadcast transmission parameters to decrease channel quality for the users when none of the received indications of channel quality indicates that channel quality needs to be improved;
    means for determining whether there is a non-broadcast user being served by the base station; and
    means for steering a null in the base station's antenna beam pattern in the direction of the non-broadcast user during broadcast transmissions.

14. The system of claim 13, wherein the means for adapting broadcast transmission parameters to improve channel quality includes utilizing at least one technique selected from a group consisting of:
    increasing broadcast transmit power;
    allocating channel resources;
    increasing a level of forward error correction (FEC) encoding for the broadcast service; and
    decreasing a transmission data rate for the broadcast service.

15. The system of claim 13, wherein the means for adapting broadcast transmission parameters to decrease channel quality includes utilizing at least one technique selected from a group consisting of:
    decreasing broadcast transmit power;
    de-allocating channel resources;
    decreasing a level of forward error correction (FEC) encoding for the broadcast service; and
    increasing a transmission data rate for the broadcast service.

16. A system in a cellular radio communication network for adapting a broadcast service, said system comprising:
    a plurality of base stations serving users who are registered with the network and are receiving the broadcast service, each of the base stations including:
        means for receiving and analyzing indications of channel quality from the users receiving the broadcast service;
        means for adapting broadcast transmission parameters to improve channel quality for the users when at least one of the received indications of channel quality indicates that channel quality needs to be improved; and
        means for adapting broadcast transmission parameters to decrease channel quality for the users when none of the received indications of channel quality indicates that channel quality needs to be improved;
        means for determining whether there is a non-broadcast user being served by the base station; and
        means for steering a null in the base station's antenna beam pattern in the direction of the non-broadcast user during broadcast transmissions; and
    a controlling network node for controlling the plurality of base stations, the controlling network node including means for coordinating the adaptation of broadcast transmission parameters among the plurality of base stations to minimize network resources utilized for the broadcast service.

17. The system of claim 16, wherein the controlling network node is a base station controller.

* * * * *